(12) United States Patent
Carnevali

(10) Patent No.: US 7,594,631 B1
(45) Date of Patent: Sep. 29, 2009

(54) QUICK CONNECT RAIL MOUNT

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 12/231,059

(22) Filed: Aug. 27, 2008

(51) Int. Cl.
*A47B 96/06* (2006.01)
(52) U.S. Cl. .............................. 248/219.4; 248/289.11
(58) Field of Classification Search ................ 248/689, 248/218.4, 219.4, 316.7, 289.11, 282.1
See application file for complete search history.

(56) References Cited

U.S. PATENT DOCUMENTS 4,325,529 A * 4/1982 Seebinger ................ 248/218.4
5,577,697 A * 11/1996 Accordino ................ 248/206.5
2005/0056744 A1 * 3/2005 Ware et al. ................ 248/219.4
2005/0145764 A1 * 7/2005 Cudney .................... 248/230.1

* cited by examiner

*Primary Examiner*—Ramon O Ramirez
(74) *Attorney, Agent, or Firm*—Charles J. Rupnick, Attorney at Law

(57) ABSTRACT

A novel quick connect mounting device for connecting to rails and other tubular structures, such as handrails on sport craft, sail and motor boats and recreation vehicles, and handlebars in general including but not limited to handlebars on a motorcycle or all terrain vehicle.

20 Claims, 12 Drawing Sheets

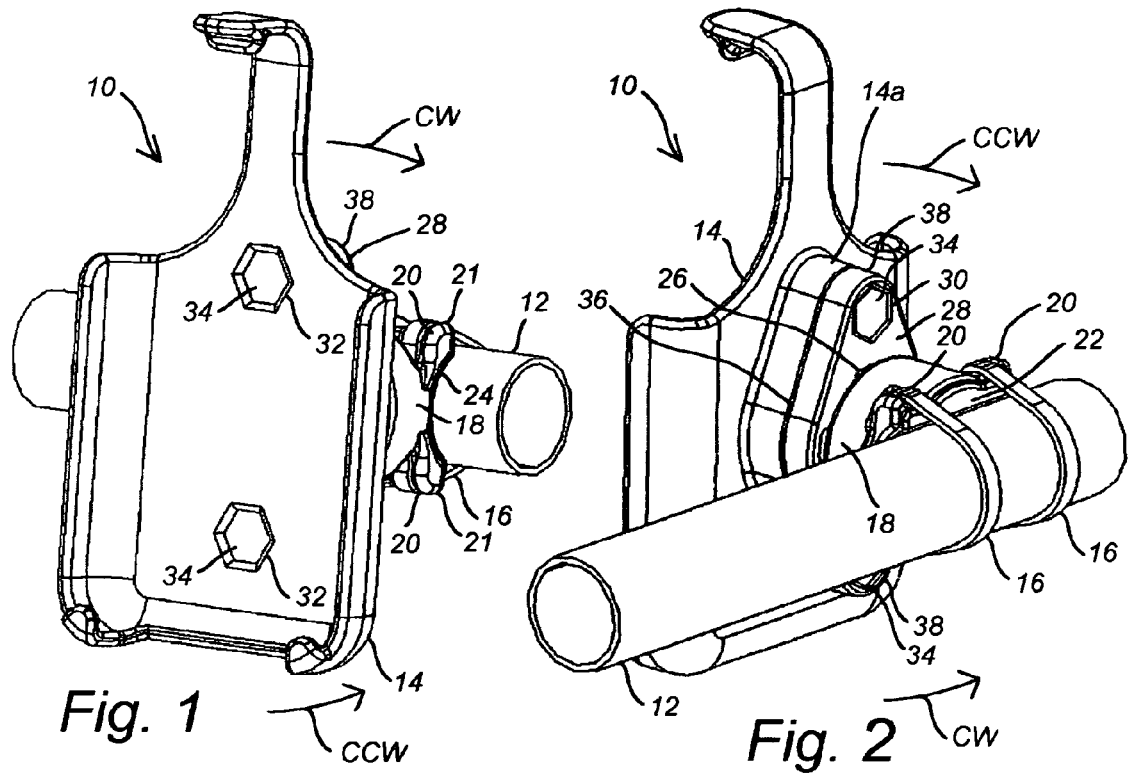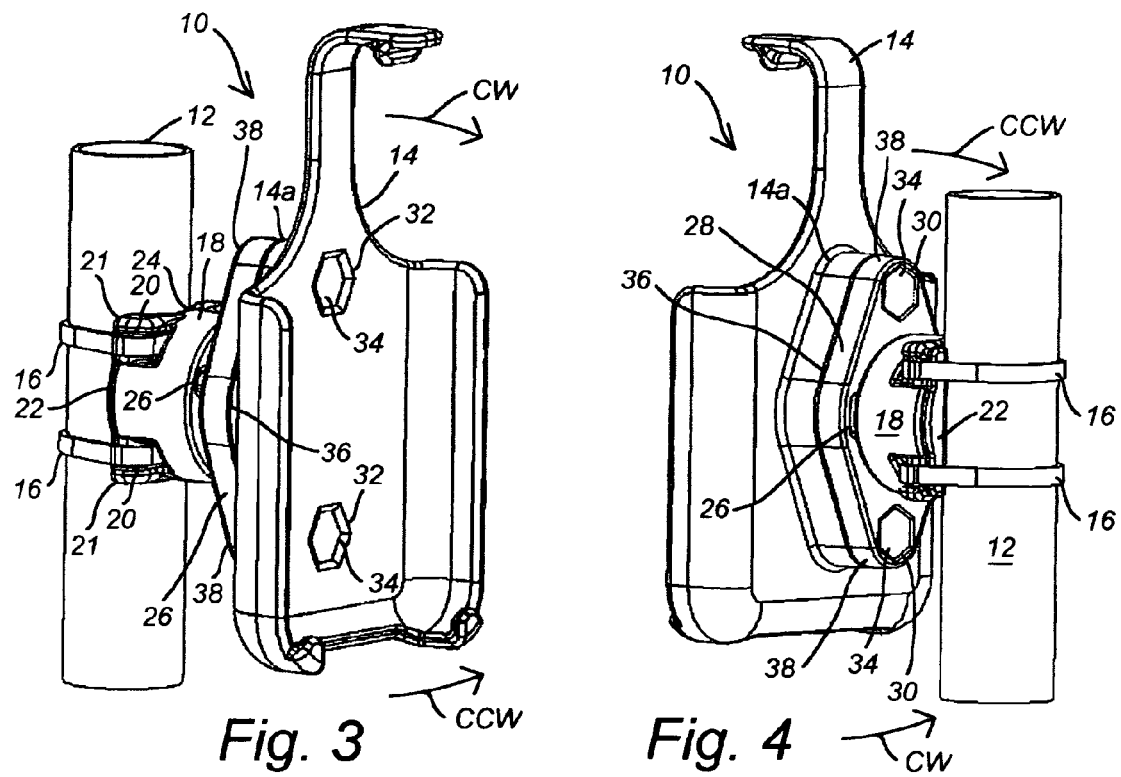

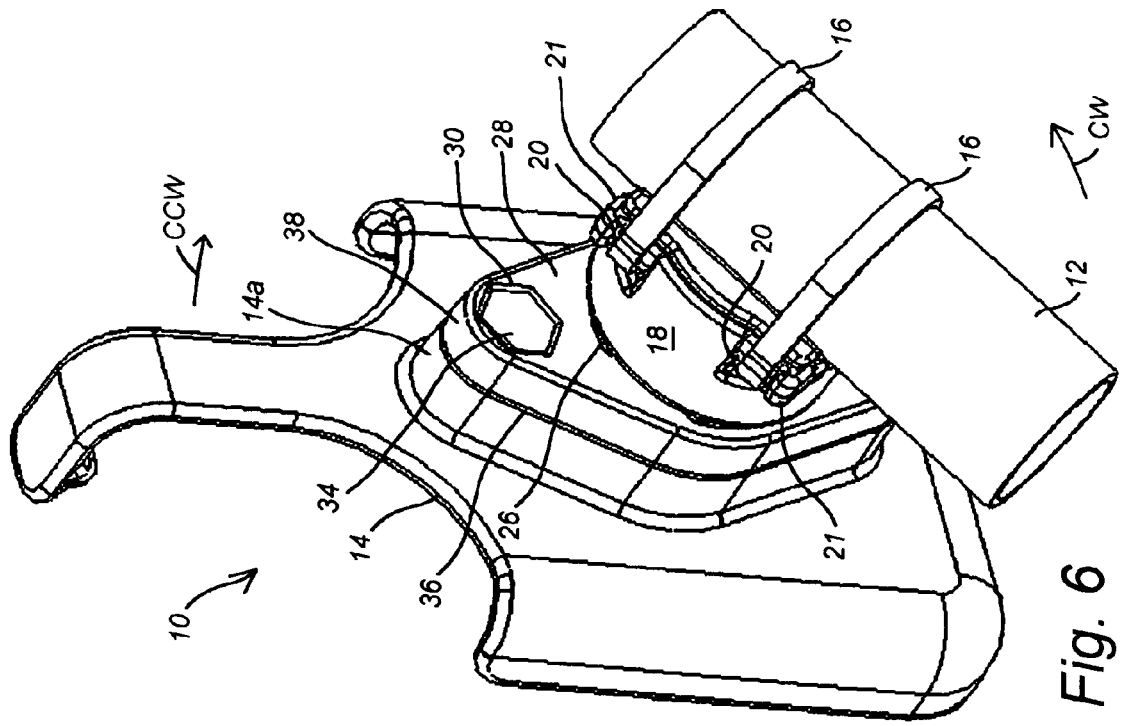
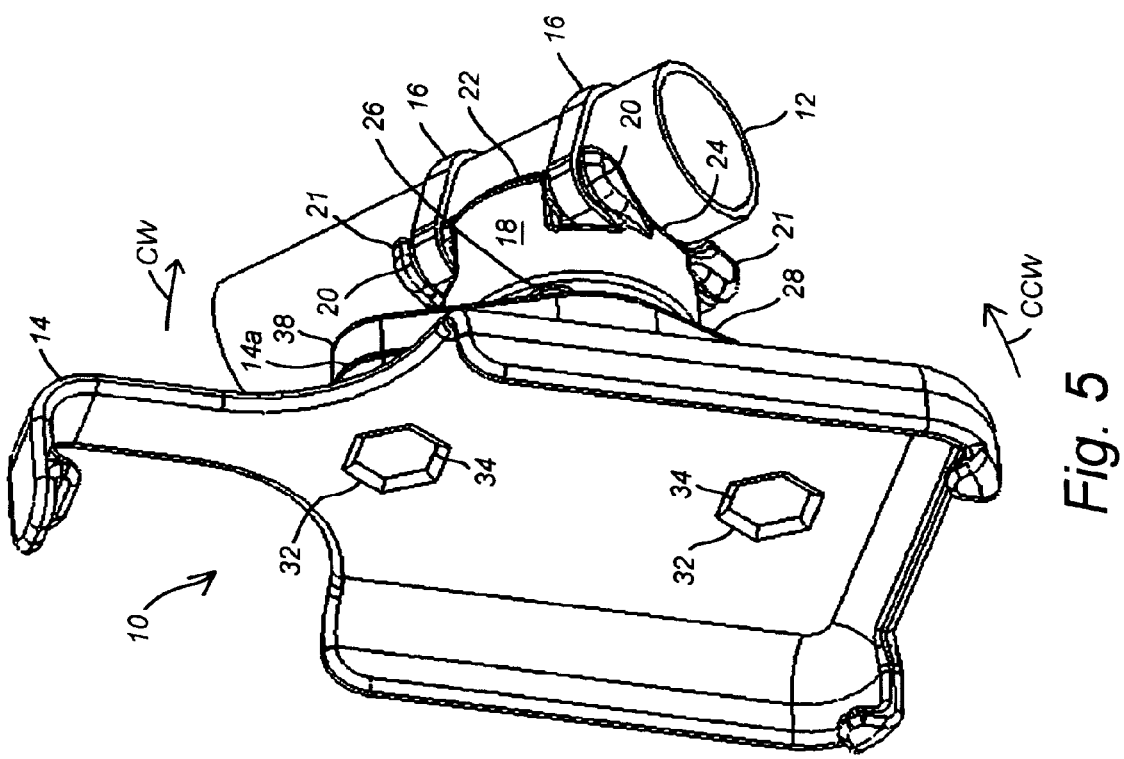

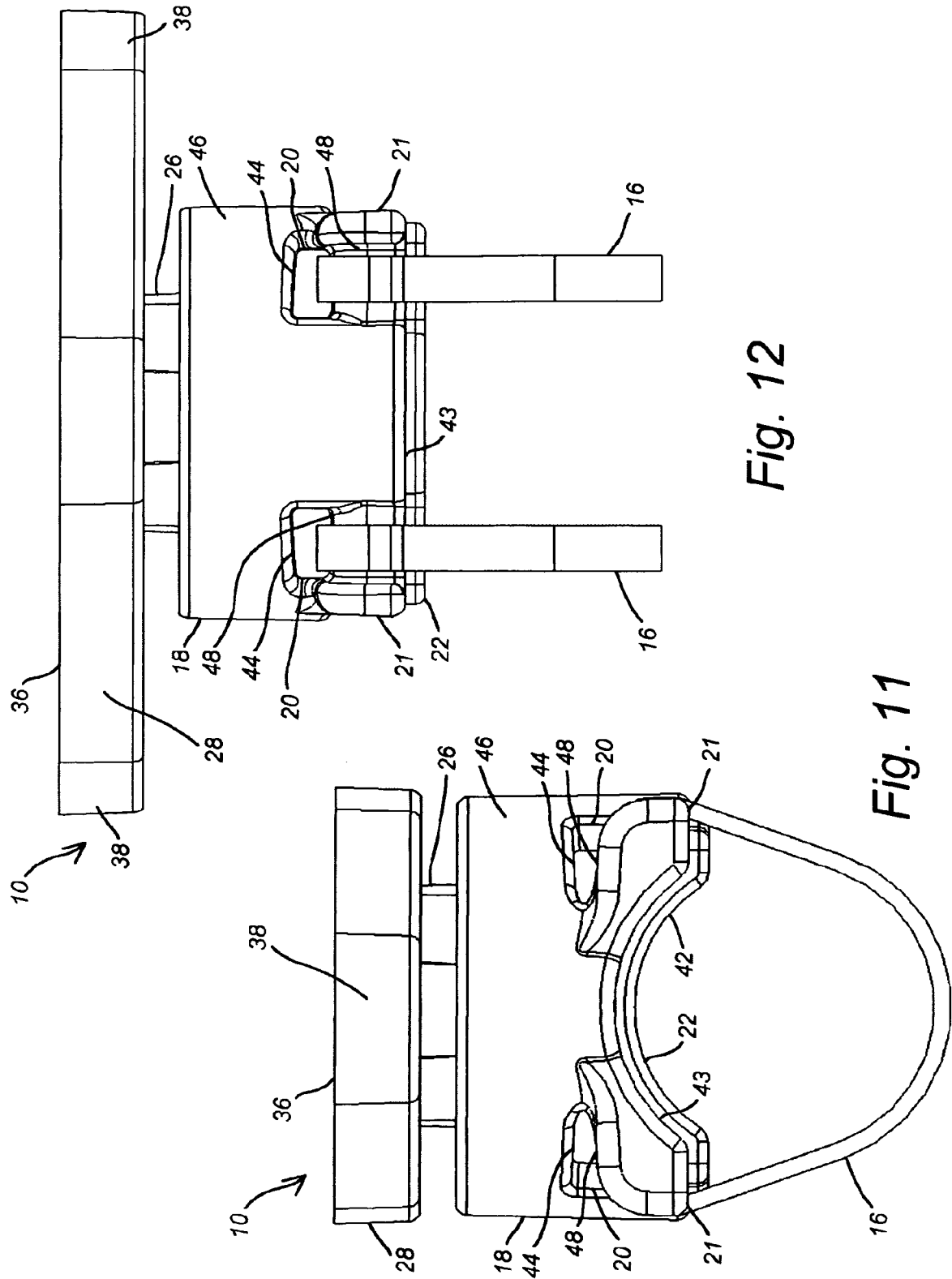

QUICK CONNECT RAIL MOUNT

FIELD OF THE INVENTION

The present invention relates generally to mounts for connecting to rails and other tubular structures, and in particular to quick release rail mounts.

BACKGROUND OF THE INVENTION

Rail mounts are generally well-known. However, known rail mounts are generally limited in performance and reliability.

SUMMARY OF THE INVENTION

The present invention is a novel quick connect mounting device for connecting to rails and other tubular structures, such as handrails on sport craft, sail and motor boats and recreation vehicles, and handlebars in general including but not limited to handlebars on a motorcycle or ATV (all terrain vehicle).

According to one aspect of the novel quick connect mounting device, the device includes a female base coupler component having a tubular sleeve forming an interior cavity substantially between an interface surface that is adjacent to a first end of the sleeve and an interior annular flange that is extended radially inwardly of the sleeve adjacent to a second end thereof opposite from the interface surface, the interior annular flange further having a substantially longitudinal passage formed substantially centrally therethrough between opposing external and internal surfaces thereof and forming a lip thereabout, and a plurality of entry slots communicating with the lip, and one or more clamp connections positioned substantially adjacent to a second end of the sleeve opposite from the interior annular flange.

A male mounting coupler component of the novel quick connect mounting device includes a mounting flange having an upper mounting surface and an opposing connection surface, and a probe extended from the connection surface of the mounting flange, the probe being matable with the sleeve of the female base coupler and rotatable relative thereto in a plurality of different interlockable orientations. The probe is formed with a tubular stem having a tubular wall sized to be received through the passage formed through the interior annular flange of the female base coupler and rotatable therein about a substantially common longitudinal axis therewith, and a plurality of ribs extended from the tubular stem in mating positions with the plurality of entry slots communicating with the lip about the passage through the interior annular flange of the sleeve.

Another component of the novel quick connect mounting device is a detent that is coupleable between one or more of the ribs of the probe and the internal surface of the interior annular flange of the sleeve, each of the detents being operable in a plurality of different rotational orientations of the probe relative to the sleeve about the common longitudinal axis.

The novel quick connect mounting device also includes a resiliently compressible biasing member that is coupled for resiliently biasing the ribs of the probe toward the internal surface of the interior annular flange of the sleeve substantially along the common longitudinal axis.

According to another aspect of the novel quick connect mounting device, the device further includes one or more clamps each being connectable with one of the clamp connections.

According to another aspect of the novel quick connect mounting device, the device further includes a rail interface member positioned on the sleeve at the interface surface thereof, the interface member being formed with a nonplanar rail interface surface, such as a curved interface surface.

According to another aspect of the novel quick connect mounting device, the interface surface of the tubular sleeve also includes a mouth opening thereinto. Additionally, the rail interface member also includes a coupler interface opposite from the rail interface surface, the coupler interface having an annular wall sized to be received into the mouth opening of the tubular sleeve and being substantially axially aligned therewith along the common longitudinal axis, and a biasing member reaction seat formed substantially centrally of the annular wall.

According to another aspect of the novel quick connect mounting device, the device further includes a biasing reaction member that is coupled to the probe with the biasing member positioned therebetween, the biasing reaction member is positioned to cooperate with the biasing member reaction seat of the rail interface member.

According to another aspect of the novel quick connect mounting device, the device further includes a retainer member coupled between the biasing reaction member and the probe for retaining the biasing member therebetween.

According to another aspect of the novel quick connect mounting device, the probe further includes an inner tubular stem residing substantially within the tubular stem thereof and forming an annular groove therebetween, and at least a portion of the biasing member resides in the annular groove between the tubular stem of the probe and the inner tubular stem thereof.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 1 through 6 illustrate a novel quick connect mounting device mounted on a rail or handlebar or like bar structure for securing a device cradle in several different orientations relative thereto, wherein FIG. 1 and FIG. 2 are front and rear pictorial views, respectively, that illustrate the device cradle being secured transverse or substantially perpendicular to the bar structure, FIG. 3 and FIG. 4 are front and rear pictorial views, respectively, that illustrate the device cradle being rotated and secured in an orientation that is substantially aligned with the bar structure, and FIG. 5 and FIG. 6 are front and rear pictorial views, respectively, that illustrate the device cradle being rotated and secured in an orientation that is at an angle relative to the bar structure with the angle being substantially intermediate between the transverse and aligned relative orientations illustrated in FIGS. 1 through 4;

FIG. 7 and FIG. 8 are front pictorial views of the novel quick connect mounting device with the bar structure and device cradle removed for clarity, wherein FIG. 7 shows opposing flanges of a mounting flange of the quick connect male mounting coupler being rotated transverse or substantially perpendicular to the female base coupler, and FIG. 8 shows the mounting flange being rotated into substantial alignment with the female base coupler;

FIG. 9 and FIG. 10 are rear pictorial views of the novel quick connect mounting device with the bar structure and device cradle removed for clarity, wherein FIG. 9 shows opposing flanges of a mounting flange of the quick connect male mounting coupler being rotated transverse or substantially perpendicular to the female base coupler, and FIG. 10 shows the mounting flange being rotated into substantial alignment with the female base coupler;

FIGS. 11 and 12 are end and side elevation views, respectively, of the novel quick connect mounting device with the bar structure and device cradle removed for clarity;

DETAILED DESCRIPTION OF PREFERRED EMBODIMENT

Figure 7:
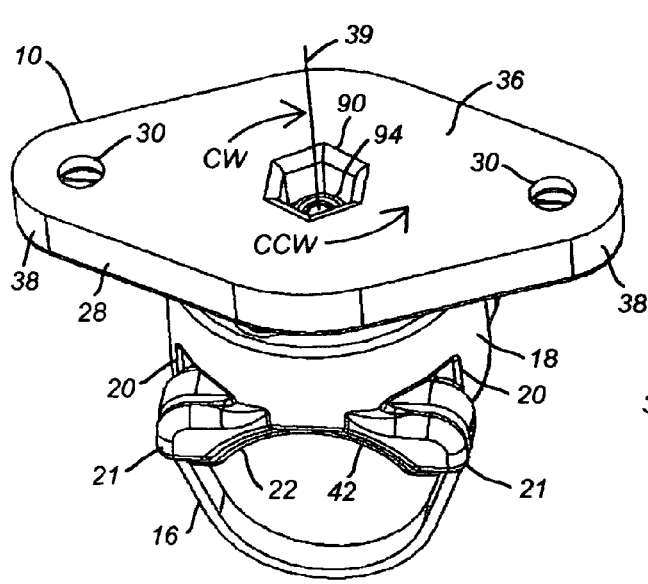

In the Figures, like numerals indicate like elements.

FIGS. 1 through 6 illustrate a novel quick connect mounting device 10 mounted on a rail or handlebar or like bar structure 12 for securing a device cradle 14 in several different orientations relative to the bar 12. In practice the device cradle 14 is of a known type structured for holding a cellular telephone or other normally hand-held electronic device such as a GPS (global positioning system) receiver, or a computing device. For example, FIG. 1 and FIG. 2 are front and rear pictorial views, respectively, that illustrate the device cradle 14 being secured transverse or substantially perpendicular to the bar structure 12.

The mounting device 10 can be secured to the bar 12 in different ways. For example, one or more tube clamps 16 are illustrated as securing a substantially rigid female base coupler 18 of the mounting device 10 firmly to the bar structure 12 substantially by wrapping there around. The single tube clamp 16 or two or more of the tube clamps 16 are coupled into clamp connections 20 provided on flanges or "ears" 21 extended from the base coupler 18 then wrapped around the rail or other bar structure 12. For example, the tube clamp or clamps 16 are screw clamps, or more commonly known as screw/band clamps, which consist of a band, commonly stainless steel in the USA, into which a screw thread pattern has been cut or pressed. One end of the band contains a captive screw. The clamp is put around a hose or the bar structure 12, with the loose end being fed into a narrow space between the band and the captive screw. When the screw is turned, it acts as a worm drive pulling the threads of the band, causing the band to tighten around the bar structure 12, or to loosen when screwed the opposite direction. Alternatively, the tube clamp or clamps 16 are spring clamps which are typically made from a strip of spring steel, cut so that one side has a narrow protrusion centered on the end, and the other side a pair of narrow protrusions on either side. The ends of these protrusions are then bent outwards, and the strip rolled to form a ring, with the protruding tabs intermeshing. To use the clamp, the exposed tabs are pressed towards each other, typically using pliers, increasing the diameter of the ring, and the clamp is slid onto the hose or the bar structure 12. The clamp is then released, and the spring steel compresses the base coupler 18 onto the bar structure 12. Another type of spring clamp is just a piece of spring steel wire bent into a loop, with the ends curled to provide handles. These are used similar to standard spring clamps, but are just pinched by hand, and provide very little clamping force. Still another option for the tube clamp or clamps 16 are wire clamps which consist of a piece of heavy wire, typically steel, first bent into a tight U, then formed into a ring shape with one end overlapping the other, and finally the ends bent outwards and cut. A captive nut is attached to one end, and a captive screw to the other. When the screw is tightened, the overlapped ends of the wire are pushed apart, tightening the wire loop around the hose or the bar structure 12. According to another alternative, the tube clamp or clamps 16 are Stepless® Ear Clamps which consist of a band, usually stainless steel, into which an "ear" or closing element has been formed. The clamp is placed over the end of the bar structure 12 and, when the ear is closed with tools designed or endorsed by the manufacturer at the base of the ear, it permanently deforms, pulling the band, and causing the band to tighten around the bar structure 12. The integrated dimple in the clamp's "ear" effectively increases the clamping force once the tool is removed. It also provides a spring effect if the diameter of the hose or bar structure 12 contracts or expands due to thermal or mechanical effects. The term "Stepless®" refers to the absence of steps or gaps on the inner circumference of the clamp. The Stepless® design provides uniform compression and a 360° seal. Other features of this style of clamp include narrow band widths, which result in a concentrated compression of the hose or bar structure 12 and tamper resistance due to the permanent deformation of the clamp's "ear."Closing the clamp "ear" with a recommended, constant tool jaw force, the clamp will compensate for any component tolerance variations. At the same time, this assembly method assures that a uniform and repeatable stress is applied to the application in addition to a consistent tensile force on the clamp material. This type of clamp was invented by Hans Oetiker in Horgen, Switzerland under the registered trade mark 'Stepless® Ear Clamp,' and the company manufactures them today with great design variety at their worldwide network of companies.

According to yet another alternative, the tube clamp 16 securing the female base coupler 18 of the mounting device 10 firmly to the bar structure 12 is a cable tie, also colloquially known as zip tie, mouse belt, tie wrap, quick draw, or rat belt. The cable tie is a type of fastener, often used for binding several electronic cables or wires together, and to organize cables and wires, but also useful for securing the female base coupler 18 of the mounting device 10 firmly to the bar structure 12. In its most popular form, a cable tie consists of a sturdy Nylon tape with an integrated gear rack, and on one end a ratchet within a small open case. Once the pointed tip at the free end of the cable tie tape has been pulled through the case and past the ratchet, it is prevented from being pulled back; the resulting loop may only be pulled tighter. Cable ties are commonly used to prevent hubcaps, also known as wheel trims, from falling off a moving vehicle, and some are sold specifically for this purpose. A cable tie tensioning device or tool may be used to apply a cable tie with a specific degree of tension. The tool may cut off the extra tail flush with the head in order to avoid a sharp edge which might otherwise cause injury. Black cable ties are used for outdoor applications, as the ultraviolet component of sunlight will degrade clear and light colors of nylon. Blue tie wraps made of ETFE (Tefzel) are used in a radiation-rich environment. Red cable ties made of ECTFE (Halar) are used for plenum cabling.

Alternatively, the one or more tube clamps 16 are conventional U-bolts and the clamp connections 20 are provided as passages through the flanges or "ears" 21 extended from the base coupler 18. The single tube clamp 16 or two or more of the tube clamps 16 are coupled into the passages 21 and secured with nuts.

An optional rail interface member 22 is shown here positioned between the base coupler 18 and the rail or bar structure 12, the interface member 22 is formed as a saddle base for adapting the base coupler 18 to cylindrical bar structures of different diameters, or rail or bar structure 12 of different geometric shapes, including square, hexagonal, or octagonal shaped bars. Accordingly, the interface member 22 is interchangeable with different interface members 22 each having a different interface surface 24 to conform the base coupler 18 to bar structures 12 having a variety of different sizes and shapes. One embodiment of the interface member 22 is structured to adapt the base coupler 18 to slightly conical bar shapes. Here, the interface member 22 is optionally formed with the interface surface 24 being curved to conform to a substantially cylindrical bar 12.

A novel quick connect male mounting coupler 26 is substantially rigid and rotatably mated with the female base coupler 18 in one of several interlockable orientations. Here, the of the rotated quick connect male mounting coupler 26 is illustrated having a mounting flange portion 28 to which the device cradle 14 is attached. For example, the mounting flange 28 is formed with one or more fastener holes 30 in positions corresponding to fastener holes 32 in the device cradle 14. Fasteners 34, such as a mating screws and nuts, are fit through the corresponding fastener holes 30, 32 for attaching an interface bracket 14a of the device cradle 14 to an upper mounting surface 36 of the mounting flange 28. According to one embodiment, the mounting flange 28 is formed with a diamond shape having diametrically opposed flanges 38 each containing one of the fastener holes 30.

In operation, the male mounting coupler 26 is rotated either clockwise or counterclockwise, as indicated in FIG. 2, relative to the female base coupler 18 to achieve any one of several relative interlockable orientations with the female base coupler 18. By extension, the device cradle 14 is simultaneously rotated either clockwise or counterclockwise relative to the bar structure 12 through the connection of the interface bracket 14a of the device cradle 14 to the upper mounting surface 36 of the mounting flange 28.

FIG. 3 and FIG. 4 are front and rear pictorial views, respectively, that illustrate the device cradle 14 being rotated and secured in an orientation that is substantially aligned with the bar structure 12.

FIG. 5 and FIG. 6 are front and rear pictorial views, respectively, that illustrate the device cradle 14 being rotated and secured in an orientation that is at an angle relative to the bar structure 12, the angle being substantially intermediate between the transverse and aligned relative orientations, for example, 45 degrees from the longitudinal axis of the bar structure 12.

Figure 8:
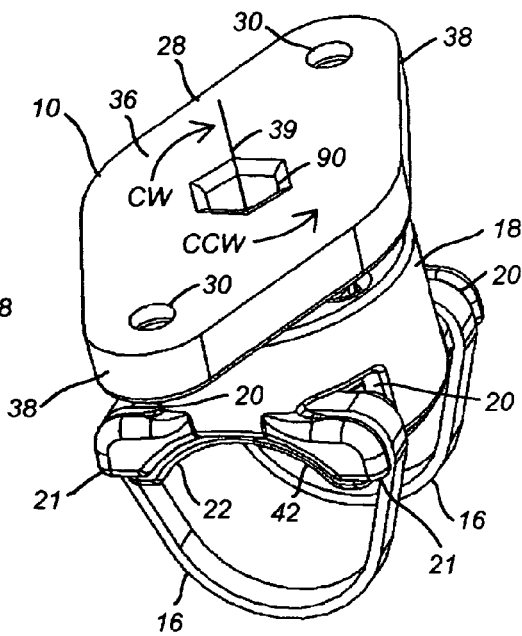

FIGS. 7 through 10 illustrate the novel quick connect mounting device 10 with the bar structure 12 and device cradle removed for clarity. For example, FIG. 7 and FIG. 8 are front pictorial views of the mounting device 10, wherein FIG. 7 shows the opposing flanges 38 of the mounting flange 28 of the quick connect male mounting coupler 26 being rotated transverse or substantially perpendicular to the female base coupler 18, and FIG. 8 shows the mounting flange 28 being rotated into substantial alignment with the female base coupler 18.

FIGS. 7 and 8 also show the male mounting coupler 26 sharing a common longitudinal axis 39 with the female base coupler 18. In operation, the male mounting coupler 26 is rotated either clockwise or counterclockwise about the common longitudinal axis 39 to achieve any one of several relative interlockable orientations with the female base coupler 18.

Figure 9:
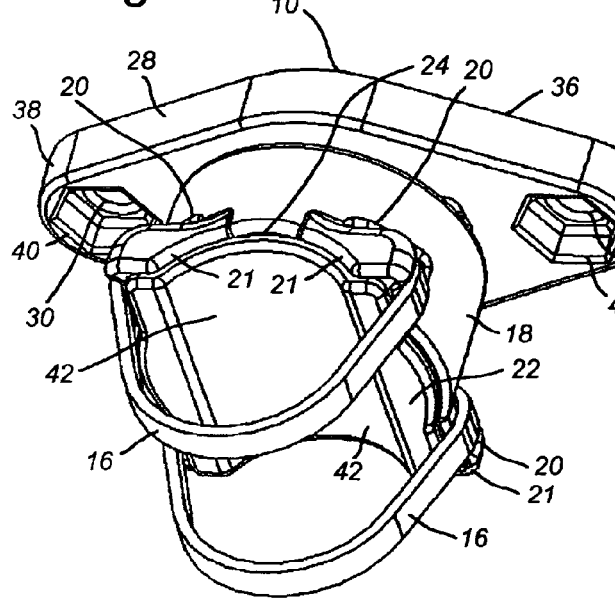
Figure 10:
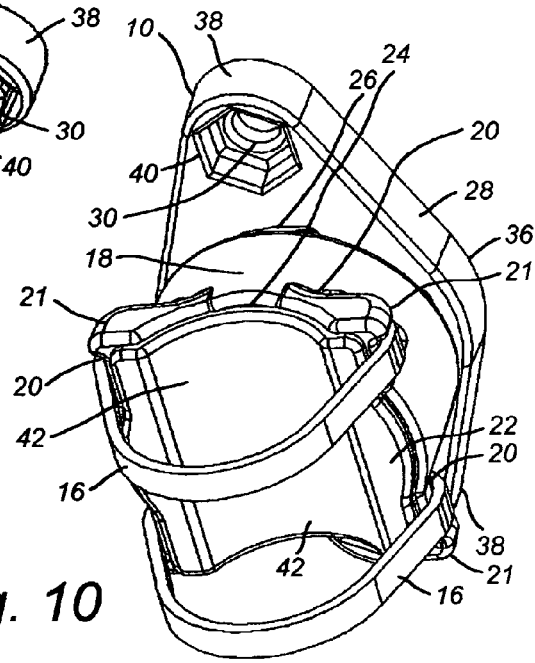

FIG. 9 and FIG. 10 are rear pictorial views of the mounting device 10, wherein FIG. 9 shows the mounting flange 28 being rotated transverse or substantially perpendicular to the female base coupler 18, and FIG. 10 shows the mounting flange 28 being rotated into substantial alignment with the female base coupler 18. FIGS. 9 and 10 show the mounting flange 28 of the mounting coupler 26 having pairs of the fastener holes 30 formed in the opposing flanges 38 and hex sockets 40 centered on the fastener holes 30 opposite from the upper mounting surface 36.

Additionally, FIGS. 9 and 10 show the conforming interface surface 24 of the optional rail interface member 22 having a non-slip interface surface 42 for maintaining rotational orientation with the bar structure 12.

FIGS. 11 and 12 are end and side elevation views, respectively, of the novel quick connect mounting device 10 with the bar structure 12 and device cradle removed for clarity. The female base coupler 18 is shown here as being formed with its own curved rail interface surface 43 which conforms to a substantially cylindrical bar 12. Thus, the optional interface member 22 is used only for providing curved interface surface 24 of different radii to conform the female base coupler 18 to cylindrical bars 12 of different diameters, or for providing other configurations of interface surface 24 to conform the female base coupler 18 to different configurations of bars 12 such as square, hexagonal or octagonal bars.

The clamps 16 are more clearly illustrated here as being coupled into clamp connections 20 provided on the base coupler 18 then wrapped around the rail or other bar structure 12. As illustrated here, the clamp connections 20 are provided by example and without limitation as passages 44 through an annular wall portion 46 of the base coupler 18. The flanges 21 form a split saddle structure having clamp seats 48 on opposite sides of the base coupler 18 substantially contiguous with the passages 44. The clamp seats 48 also straddle the optional rail interface member 22, if present, so that the tube clamps 16 also clamp the interface member 22 to the rail structure 12.

Figure 13:
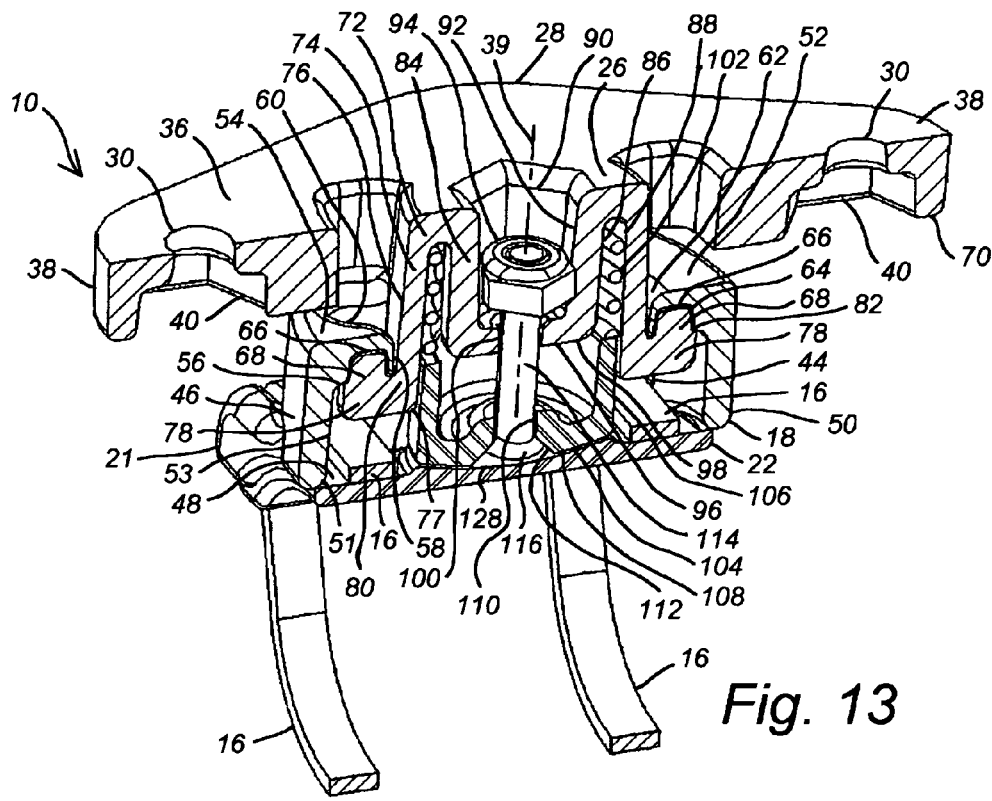
FIG. 13 is a cross-section view showing operational components of the novel quick connect mounting device.

FIG. 13 is a cross-section view showing the operational components of the novel quick connect mounting device 10.

The female base coupler 18 is formed of an annular collar 50 having a sleeve or barrel formed of the longitudinally extended tubular wall 46 having a mouth opening 51 formed in the rail interface surface 43 adjacent to its first end. The annular collar 50 is partially closed at its second opposite end with an annular flange 52 interior of the tubular wall 46 and forming an interior cavity 53 therewithin. By example and without limitation, the rail interface surface 43 and mouth opening 51 formed therein is curved to adapt the base coupler 18 to a particular diameter of rail 12. However, the rail interface surface 43 and mouth opening 51 are optionally arched or "V" shaped to adapt to different rails 12 having different diameters. Else, the rail interface surface 43 and mouth opening 51 are substantially planar for adapting to a rail 12 having flat surfaces, such as square, rectangular, hexagonal or octagonal rails.

The flange 52 is extended radially inwardly of the tubular wall 46 adjacent to one end thereof and is formed with an external surface 54 and an opposing internal surface 56. The interior annular flange 52 is formed with a substantially centrally positioned longitudinal passage 58. One or more pairs of entry slots 60 are formed in substantially diametrically opposed positions in an interior lip portion 62 of the longitudinal passage 58, the pairs of entry slots 60 are formed substantially radially outwardly of the longitudinal passage 58 and communicate therewith. One or more pairs of interlocking detents 64 operate in substantially diametrically opposed positions between the base coupler 18 and the mounting coupler 26. By example and without limitation, the detents 64 are formed of interlocking pairs of sockets 66 and upright mating pins 68 distributed between the base coupler 18 and mounting coupler 26. The sockets 66 of the detents 64 are illustrated here as being formed in the internal surface 56 of the interior annular flange 52, and the mating pins 68 are illustrated here as being formed in the mounting coupler 26. However, without deviating from the scope and intent of the present invention the relative positioning of the sockets 66 and mating pins 68 are optionally reversed, with the sockets 66 being formed in the mounting coupler 26 and the mating pins 68 being formed in the internal surface 56 of the interior annular flange 52.

The male mounting coupler 26 is matable with the female base coupler 18 and rotatable relative thereto in a plurality of different interlockable orientations, as illustrated by example and without limitation in FIGS. 1 through 12. The male mounting coupler 26 includes the mounting flange 28 formed as a mounting flange having the upper mounting surface 36 and an opposing connection surface 70. According to one embodiment, the mounting flange 28 is formed with a diamond shape having the two diametrically opposed flanges 38 each containing one of the two fastener holes 30. A probe 72 is extended from the connection surface 70 of the mounting flange 28. The probe 72 is formed with an outer tubular stem 74 having an annular outer wall 76 sized to be received through the central longitudinal passage 58 formed through the interior annular flange 52 of the female base coupler 18 with a mouth opening 77 thereinto opposite from the mounting flange 28. The longitudinally extended annular outside wall 76 is further sized relative to the longitudinal passage 58 of the annular collar 50 to be received slidingly thereinto so as to cause the outer tubular stem 74 to be substantially axially aligned therewith.

The probe 72 is formed with one or more pairs of ribs 78 extended radially outwardly of the outer tubular stem 74 like spokes of a wheel and each in a substantially diametrically opposed position across the tubular stem 74. The ribs 78 are spaced away from the connection surface 70 of the mounting flange 28 and positioned adjacent to a far end 80 of the tubular stem 74 adjacent to the mouth opening 77.

The opposed pairs of ribs 78 cooperate with the similarly opposed pairs of slots 60 in the interior lip portion 62 of the annular collar 50 to form a keying mechanism operable between the outer tubular stem 74 of the probe 72 and the interior annular flange 52 of the annular collar portion 50 of the female base coupler 18. For example, the substantially diametrically opposed pairs of ribs 78 are arranged to align with the similarly substantially diametrically opposed pairs of slots 60 in the interior lip portion 62 of the annular collar 50 of the female base coupler 18. Each rib 78 is sized to pass through a corresponding one of the entry slots 60. Furthermore, the pairs of upright pins 68 are positioned on the ribs 78 to be received into any pair of the sockets 66 formed in the internal surface 56 of the interior annular flange 52 that partially closes the longitudinally extended tubular wall 46 of the annular collar 50. Accordingly, each rib 78 is formed with one of the pins 68 extended upright from an inner surface 82 of the corresponding rib 78 and substantially toward the connection surface 70 of the mounting flange 28 and is further spaced away from the annular outer wall 76 of the outer tubular stem 74 of the probe 72. Each pin 78 is further sized to be received snuggly into any one of the sockets 66.

The probe 72 extended from the connection surface 70 of the mounting flange 28 is also formed with a substantially thimble shaped inner tubular stem 84 having an outside surface 86 that is spaced inwardly of the outer tubular stem 74 and substantially concentrically aligned therewith such that an annular groove 88 is formed therebetween. The inner tubular stem 84 is also formed with an inside retaining surface 90 shaped with a plurality of opposing substantially planar interior side walls 92, for example, forming a hexagonal recess sized to receive a conventional hex nut 94. An interior flange or end cap 96 of the inner tubular stem 84 is extended inwardly of the inside retaining surface 90 in a position adjacent to a far end 98 thereof and spaced away from the connection surface 70 of the mounting flange 28. The interior flange or end cap 96 of the inner tubular stem 84 has a substantially longitudinal passage 100 formed substantially centrally therethrough.

A resilient expansion member 102, such as a conventional compression spring, is resident substantially within the annular groove 88 formed between the thimble shaped inner tubular stem 84 and outer tubular stem 74. The resilient expansion member or compression spring 102 is sized to operate substantially within the annular groove 88 and provide an increase in force substantially proportional to deflection.

An expansion or spring reaction member 104 is provided for operational compression of the spring 102. For example, the spring reaction member 104 forms a thimble shape having a substantially tubular wall 106 sized to be slidingly received into the mouth 77 of the outer tubular stem portion 74 of the probe 72, and optionally into the annular groove 88 between the thimble shaped inner tubular stem 84 and outer tubular stem 74, as well. The spring reaction member 104 is further formed with its own interior flange or end cap 108 which is extended inwardly of the tubular wall 106 in a position adjacent to one end thereof opposite from the interior flange or end cap 96 of the inner tubular stem portion 84 of the probe 72. A substantially longitudinal passage 110 is formed substantially centrally through the interior flange or end cap 108 and formed with a recessed fastener seat 112, such as a countersink (shown) or counter bore.

A retainer member 114 is coupled substantially along the common longitudinal axis 39 between the interior flange or end cap 108 of the spring reaction member 104 and the interior flange or end cap 96 of the inner tubular stem portion 84 of the probe 72 for retaining the spring reaction member 104 adjacent to an end portion of the resilient expansion member or spring 102 opposite from the connection surface 70 of the mounting flange 28. For example, the retainer member 114 is formed with a first end portion or head 116 sized larger than the substantially central longitudinal passage 110 formed through the interior flange or end cap 108 of the spring reaction member 104. The hex nut 94 operates as a second end portion of the retainer member 114 that is sized larger than the substantially central longitudinal passage 100 formed through the interior flange or end cap 96 of the inner tubular stem portion 84 of the probe 72. Ideally, the hex nut 94 is sized to be received between the plurality of opposing substantially planar side walls 92 of the inside retaining surface 90 of the inner tubular stem portion 84 of the probe 72 and is shaped with a plurality of substantially planar exterior surfaces (shown) substantially corresponding to the side walls 92 of the inside retaining surface 90 for being substantially restrained from turning therein. A shaft portion (indicated at 114) of the retainer member 114 is sized to be slidingly received through both the longitudinal passage 110 formed through the interior flange or end cap 108 of the spring reaction member 104 and the longitudinal passage 100 formed through the interior flange or end cap 96 of the inner tubular stem portion 84 of the probe 72. The retainer member 114 thus couples the end cap 108 of the spring reaction member 104 to the end cap 96 of the inner tubular stem portion 84 of the probe 72. Additionally, when the retainer member 114 is a screw, as shown, with hex nut 94, a distance between the fastener head 116 and nut 94 of the retainer member 114 further being optionally adjustable, wherein the shaft portion of the retainer member 114 is a substantially cylindrical shaft being at least partially threaded there along, the first end portion of which is the head portion 116 coupled adjacent to one end of the shaft, and the second end portion of which is the hex nut 94 threadedly engaged with the threaded portion of the shaft. Accordingly, an initial compression of the spring 102 can be set by tightening or loosening the nut 94 on the shaft 114. Similarly, an initial expansion of the spring reaction member 104 relative to the probe 72 of the male mounting coupler 26 can be set by tightening or loosening the nut 94 on the shaft 114.

Figure 14:
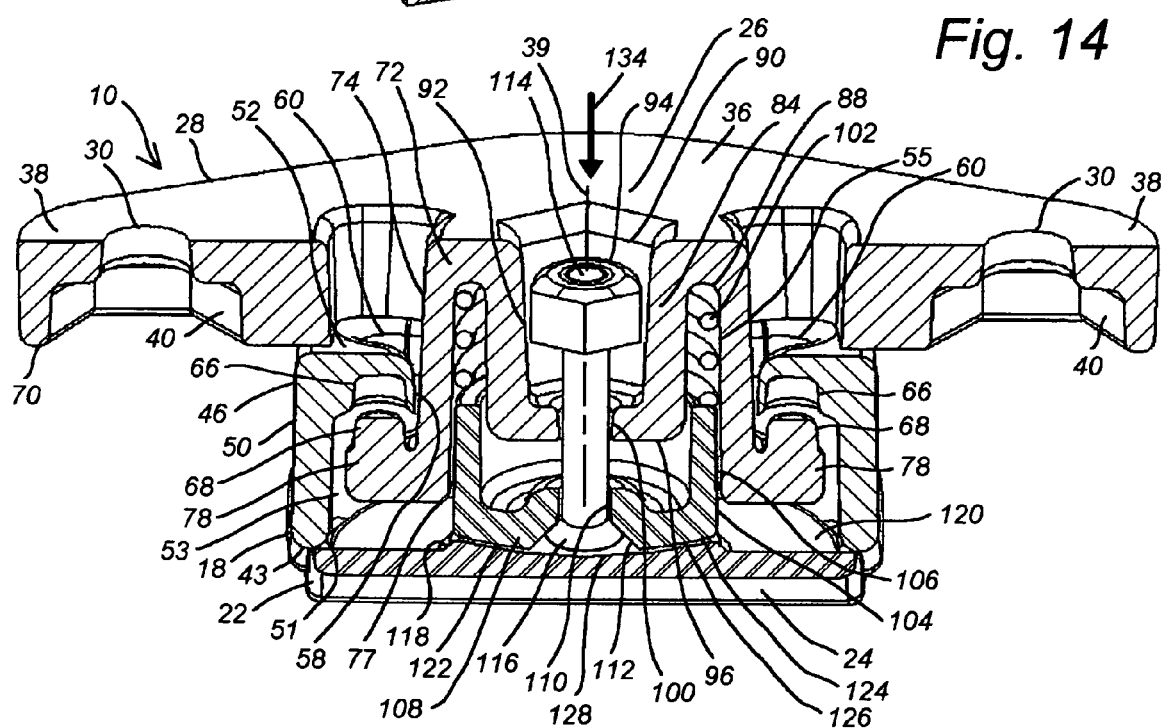
FIG. 14 is another cross-section view showing the operational components of the novel quick connect mounting device that illustrates a plurality of interlocking detents being disengaged between the base coupler and the mounting coupler.

FIG. 14 is another cross-section view showing the operational components of the novel quick connect mounting device 10 with the interlocking detents 64 disengaged between the base coupler 18 and the mounting coupler 26. Here, for example, the pairs of pins 68 are disengaged from one pair of the sockets 66. Accordingly, the mounting coupler 26 may be rotated relative to the base coupler 18 by rotating the outer tubular stem 74 of the probe 72 within the central longitudinal passage 58 of the interior annular flange 52.

The optional rail interface member 22 is shown here as being positioned between base coupler 18 and the rail or bar structure 12 (removed for clarity). The interface member formed as a saddle base interface member 22 adapts the base coupler 18 to cylindrical bar structures of different diameters, or rail or bar structure 12 of different geometric shapes, including square, hexagonal, or octagonal shaped bars. The curved rail interface surface 24 is shown here in longitudinal cross-section. The rail interface member 22 includes a coupler interface structure 118 formed on its outer surface 120 opposite from its rail interface surface 24 and having a reaction member seat 122 formed therein. The coupler interface structure 118 is formed, by example and without limitation, having a self-locating mechanism 124 operable between the spring reaction member 104 and the reaction member seat 122, wherein the self-locating mechanism is provided by an outer convexly curved surface 126 of the interior flange or end cap 108 of the spring reaction member 104 and the reaction member seat 122, and a correspondingly concavely curved surface 128 of the reaction member seat 122.

Figure 15:
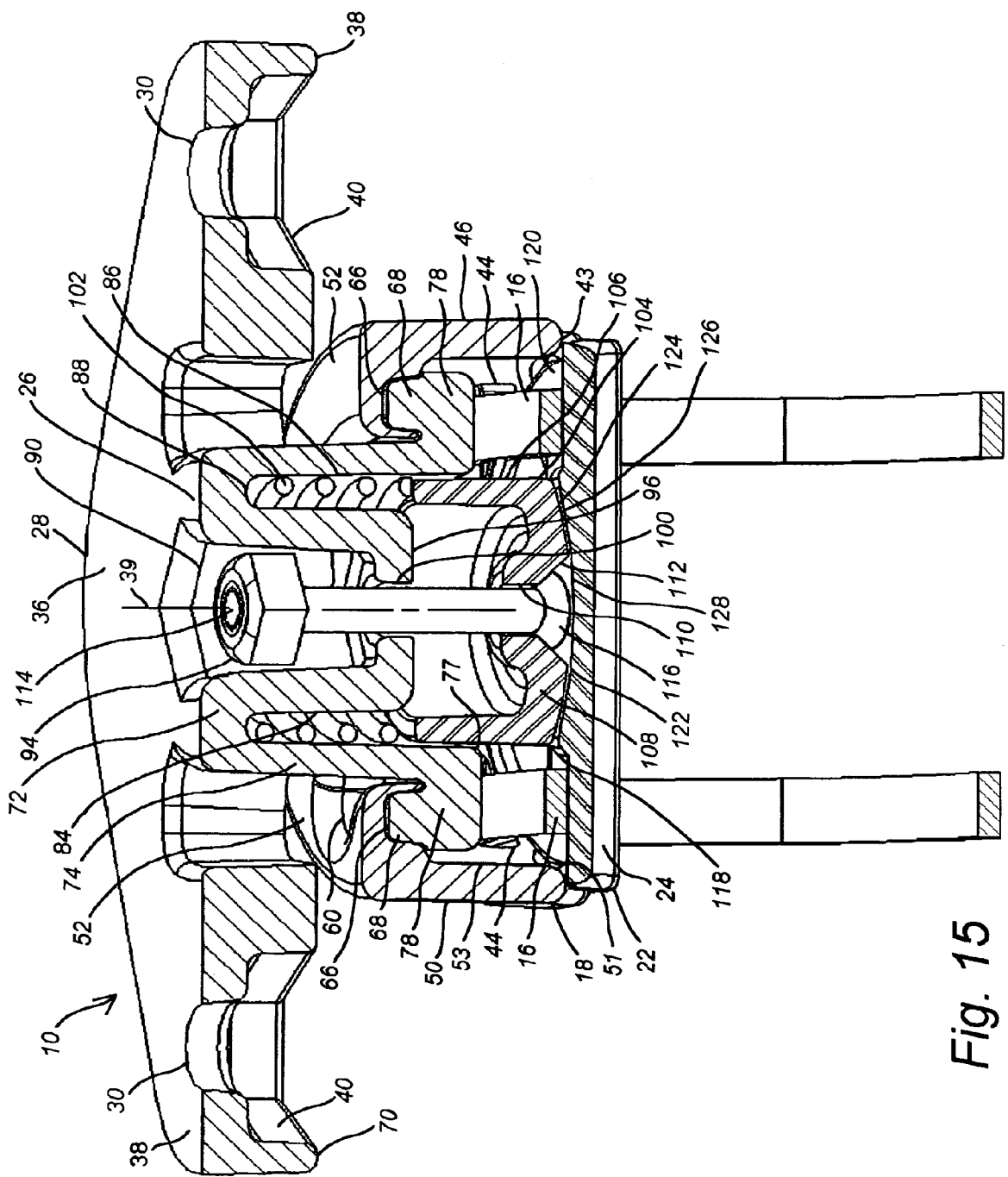
FIG. 15 is another cross-section view showing the operational components of the novel quick connect mounting device illustrating the interlocking detents being engaged between the base coupler and the mounting coupler.

FIG. 15 is another cross-section view showing the operational components of the novel quick connect mounting device 10 with the interlocking detents 64 engaged between the base coupler 18 and the mounting coupler 26. Here, for example, the mounting coupler 26 has been rotated relative to the base coupler 18 from the configuration shown in FIGS. 13 and 14 by rotating the outer tubular stem 74 of the probe 72 within the central longitudinal passage 58 of the interior annular flange 52 while the pairs of upright pins 68 were disengaged from the first pair of the sockets 66. Here, the pairs of pins 68 are alternately engaged with a second pair of the sockets 66, whereby the detents 64 are interlocked to maintain the relative rotational orientation of the mounting coupler 26 with the base coupler 18. See, for example, the plurality of different interlockable orientations illustrated by example and without limitation in FIGS. 1 through 12.

Figure 16:
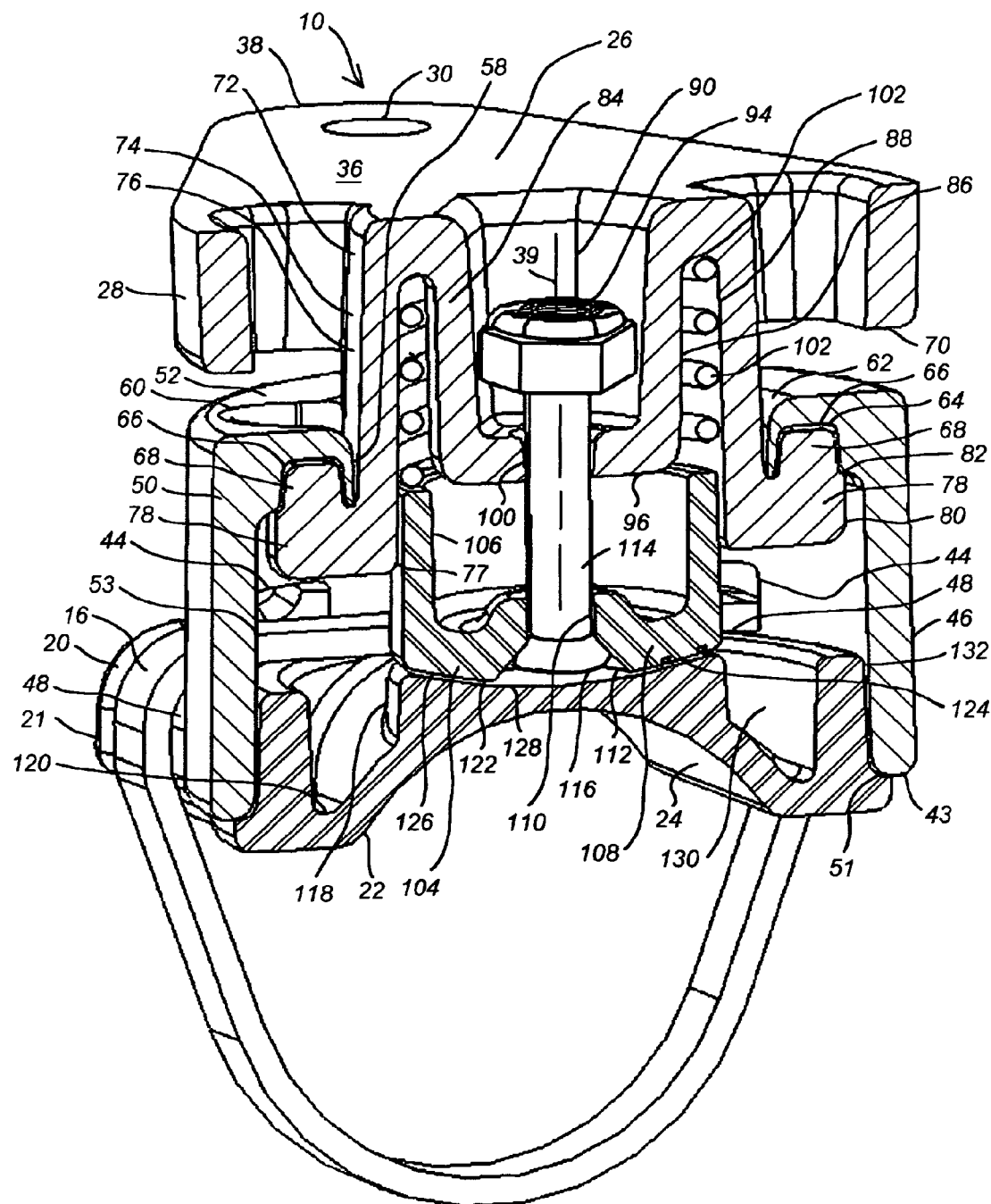
FIG. 16 is another cross-section view of the configuration shown in FIG. 15 and showing the operational components of the novel quick connect mounting device.

FIG. 16 is another cross-section view of the configuration shown in FIG. 15 and showing the operational components of the novel quick connect mounting device 10. Here, the optional rail interface member 22 is illustrated by example and without limitation as including an annular outer wall 130 having an outer surface 132 sized to be slidingly received through the mouth opening 51 of the rail interface surface 43 into the annular wall portion 46 of the annular collar 50 of the base coupler 18 and into the interior cavity 53 therein.

Figure 17:
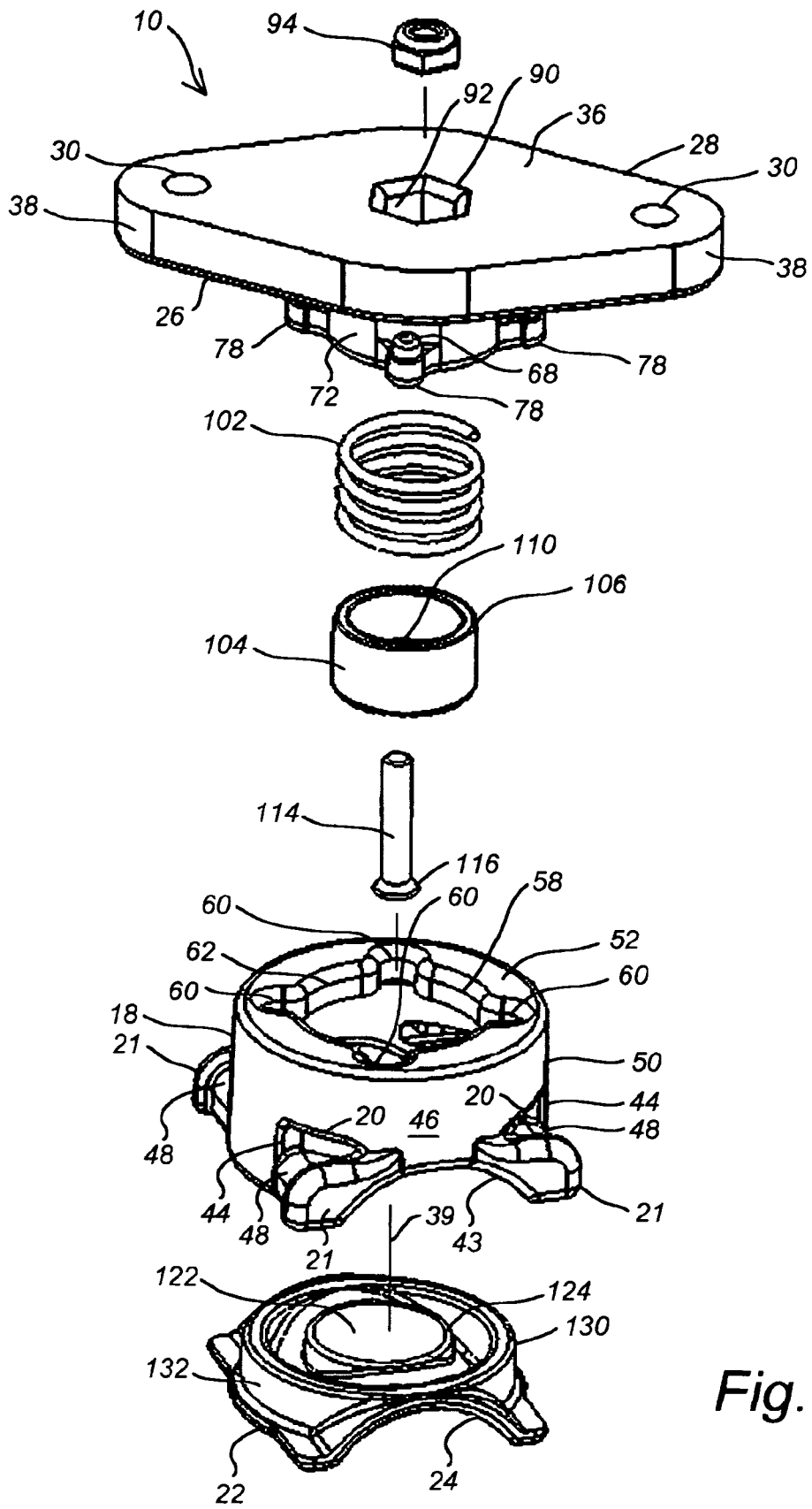
FIG. 17 is an exploded view showing the operational components of the novel quick connect mounting device and the assembly thereof.

FIG. 17 is an exploded view showing the operational components of the novel quick connect mounting device 10 and their general order of assembly. As illustrated here, the male mounting coupler 26 is assembled substantially along the common longitudinal axis 39 with the resilient expansion member or spring 102 and the expansion or spring reaction member 104 by the retainer member 114. The spring reaction member 104 is fit into the mouth opening 77 of the outer tubular stem 74 adjacent to the annular groove 88 formed between the outer tubular stem 74 and the inner stem 84 of the probe 72 portion of the male mounting coupler 26. The annular wall 106 of the spring reaction member 104 is slid into the outer tubular stem 74 of the probe 72 and is used to compress spring reaction member 104 into the annular groove 88. The shaft of the retainer member 114 is passed through the longitudinal passage 110 formed substantially centrally through the interior flange or end cap 108 of the spring reaction member 104 and through the substantially central longitudinal passage 100 through the interior flange or end cap 96 of the probe's inner tubular stem 84. The nut 94 is inserted into the inside retaining surface 90 in the probe 72 of the male mounting coupler 26 where it is restricted from turning by the plurality of opposing interior side walls 92. Accordingly, the threaded retainer member 114 is turned within the nut 94 without use of additional tools such as a wrench.

Preload on the resilient expansion member or spring 102 is provided by adjusting penetration of the spring reaction member 104 into the mouth opening 77 between the outer annular walls 76 of the outer tubular stem 74 of probe 72, and ultimately into the annular groove 88 between the outer tubular stem 74 and the probe's thimble shaped inner tubular stem 84. Penetration of the spring reaction member 104 relative to probe 72 is adjusted by adjusting the length of the shaft of the retainer member 114 compressing the spring reaction member 104 into the mouth opening 77 of the outer annular wall 76 of the outer tubular stem 74. Here, the length of the shaft of the retainer member 114 is adjusted by adjusting the position of the nut 94 relative to the retainer member's first end portion or head 116 which cannot pass through the passage 110 in the interior flange or end cap 108 of the spring reaction member 104, whereby preload on the resilient expansion member or spring 102 is adjusted.

If the optional rail interface member 22 is not present, the annular collar 50 of the base coupler 18 is positioned with the curved, arched or planar rail interface surface 43 and mouth opening 51 of the annular wall portion 46 against the correspondingly curved, arched or planar rail or bar structure 12. One or more of the straps or other clamps 16 are fed through the passages 44 of the clamp connections 20 and around the bar 12. Then the clamps 16 are seated against the clamp seats 48 on opposite sides of the base coupler 18 and cinched around the bar 12.

If present, the optional rail interface member 22 is either positioned on the rail or bar structure 12, and the rail interface surface 43 and mouth opening 51 of the annular wall portion 46 of the annular collar 50 of the base coupler 18 is fit over the annular outer wall 130 of the rail interface member 22. Else, the rail interface member 22 is slidingly fit through the rail interface surface 43 and mouth opening 51 into the annular wall portion 46 of the annular collar 50 of the base coupler 18, then positioned on the rail or bar structure 12. Then one or more of the straps or other clamps 16 are fed through the passages 44 of the clamp connections 20 and around the bar 12, and the clamps 16 are seated against the clamp seats 48 on opposite sides of the base coupler 18 and cinched around the bar 12.

Figure 18:
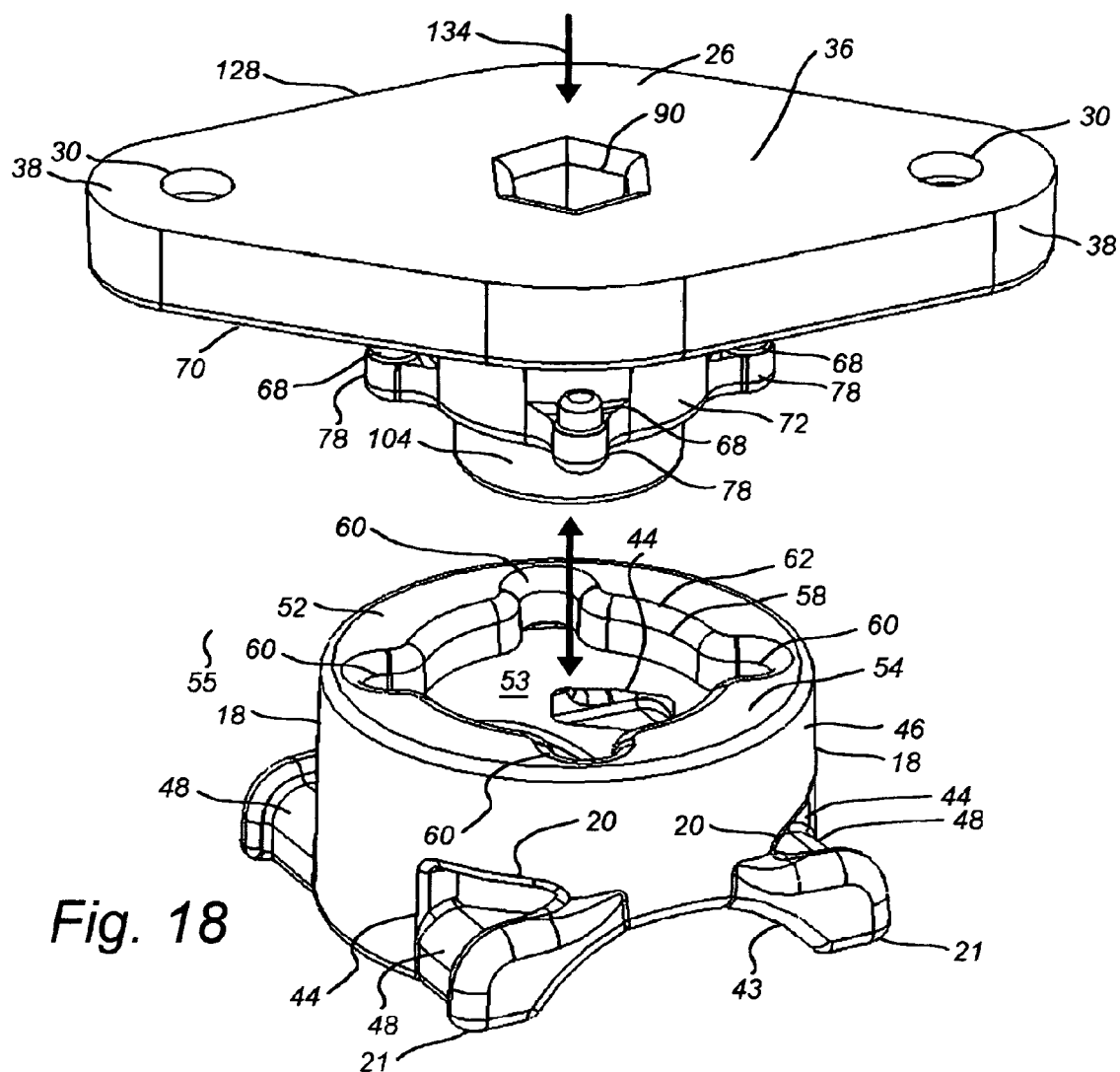
FIG. 18 is a partially exploded view that illustrates assembly of the male mounting coupler of the novel quick connect mounting device with the female base coupler.
Figure 19:
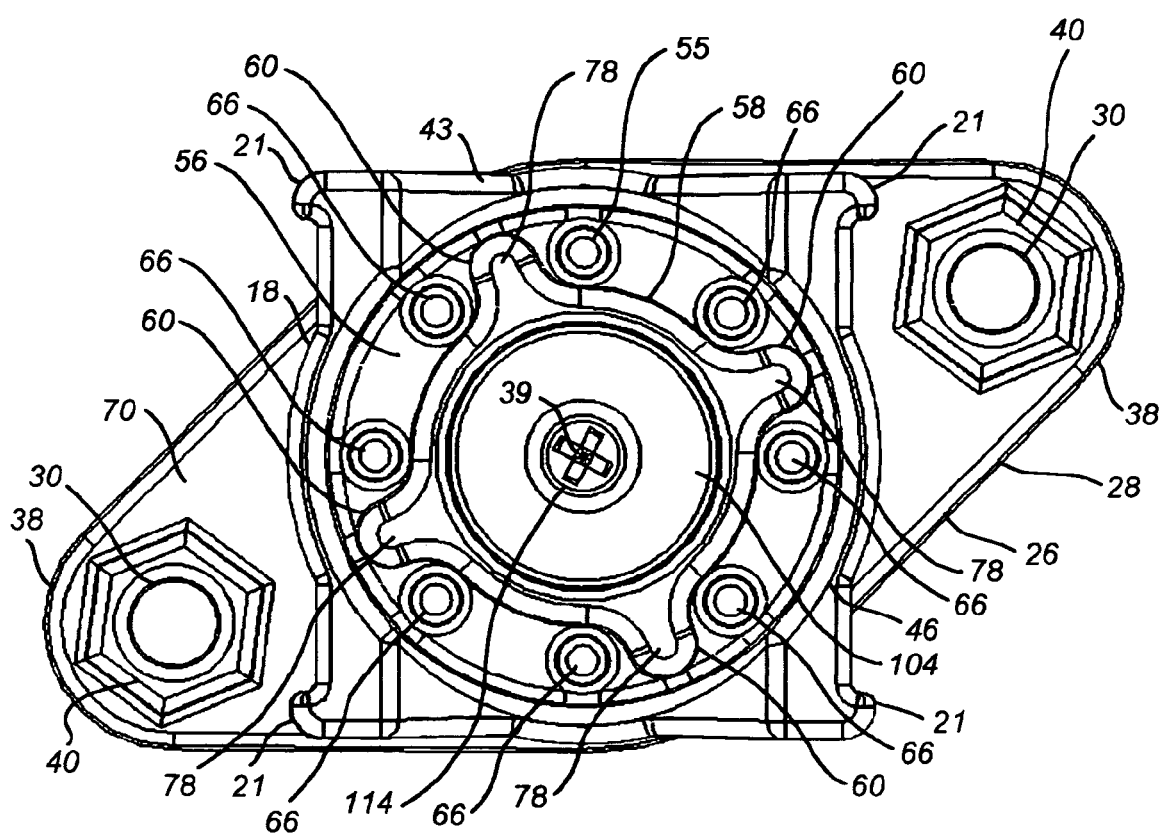
FIG. 19 is a bottom view that further illustrates assembly of the male mounting coupler of the novel quick connect mounting device with the female base coupler.

FIG. 18 is a partially exploded view that illustrates assembly of the male mounting coupler 26 of the novel quick connect mounting device 10 with the female base coupler 18. FIG. 19 is a bottom view that further illustrates assembly of the novel quick connect mounting device 10. As illustrated here, with the base coupler 18 and optional rail interface member 22, if present, secured to the rail or bar structure 12 by the straps or other clamps 16, the assembled male mounting coupler 26 is assembled with the base coupler 18. The novel quick connect mounting device 10 is assembled by insertion of the spring reaction member 104 through the longitudinal passage 58 of the interior annular flange 52 into the interior cavity 53 of the annular collar 50. The probe 72 follows the spring reaction member 104 into the interior cavity 53 of the annular collar 50. The keying mechanism is operated to assemble the male mounting coupler 26 with the base coupler 18. For example, here the male mounting coupler 26 is rotated, and the probe 72 is rotated therewith, until the pair of ribs 78 are substantially aligned with the pair of slots 60 in the interior annular flange 52 of the annular collar 50. Once aligned, the cooperating pairs of ribs 78 and slots 60 of the keying feature permit the pair of ribs 78 to be inserted through interior annular flange 52 of the annular collar 50 by passing through the pair of slots 60 into the interior cavity 53 of the annular collar 50.

During insertion of the probe 72 into the interior cavity 53 of the annular collar 50, the end cap 108 of the thimble shaped spring reaction member 104 bottoms against the rail structure 12 or the surface 128 of the reaction member seat 122, if present. Compressive pressure 134 is applied against the mounting flange 28 of the male mounting coupler 26, either directly on its upper mounting surface 36 or through the device cradle 14, if present, at its interface bracket 14a. The pressure 134 is applied toward the coupler 18 and rail structure 12 to force the connection surface 70 of the mounting flange 28 toward the external surface 54 of the flange 52 having the central passage 58 therethrough into the internal cavity 53 of the annular collar 50. The pressure 134 is effective to compress the resilient expansion member or spring 102 whereby the spring reaction member 104 slides into the mouth 77 of the outer tubular stem portion 74 of the probe 72.

Sliding the spring reaction member 104 slides into the mouth 77 of the outer tubular stem portion 74 of the probe 72 allows room within the interior cavity 53 of the tubular annular wall portion 46, which permits the outer tubular stem 74 of the probe 72 to enter into the annular collar 50 of the base coupler 18. Continued application of the pressure 134 permits the pair of ribs 78 to be inserted through the pair of slots 60 in the interior lip portion 62 of the passage 58 through the flange 52. Still continued application of the pressure 134 permits the pins 68 on the ribs 78 to pass through the pair of slots 60 and into the interior cavity 53 of the tubular annular wall portion 46. See, for example, FIG. 14.

As illustrated in FIG. 14, yet more pressure 134 applied to the mounting flange 28 of the male mounting coupler 26 causes the resilient expansion member or spring 102 to compress enough to permit the pair of ribs 78 to be inserted far enough through the pair of slots 60 to cause the upright pins 68 to pass far enough into the interior cavity 53 of the tubular annular wall portion 46 to clear the internal surface 56 of the flange 52. Once clear of the internal surface 56 of the flange 52, the pair of ribs 78 and their upright pins 68 may be rotated within the interior cavity 53 of the tubular annular wall portion 46 to any orientation corresponding to a mating pair of the sockets 66 in the internal surface 56 of the flange 52.

The male mounting coupler 26 may be rotated relative to the female base coupler 18 to any rotational orientation where the upright pins 68 on the pair of ribs 78 corresponds to a pair of the mating sockets 66 as illustrated for example in FIG. 19.

As further illustrated in FIG. 19, the internal surface 56 of the flange 52 has a plurality of the pair of mating sockets 66 in different rotational orientations, so the upright pins 68 on the pair of ribs 78 find a plurality of different positions to mate with the sockets 66. As the upright pins 68 on the pair of ribs 78 are moved to different pairs of the mating sockets 66 the male mounting coupler 26 is moved to different rotational orientations relative to the female base coupler 18. The different pairs of mating sockets 66 are optionally substantially uniformly distributed around the internal surface 56 of the flange 52. As illustrated here by example and without limitation, the internal surface 56 of the flange 52 is set with four different pairs of the mating sockets 66 oriented approximately at 0 degrees, 45 degrees and 90 degrees relative to the interface surface 43 of the base coupler 18.

The quantity of pairs of entry slots 60 and ribs 78 is optionally the same between the flange 52 of the female base coupler 18 and the probe 72 of the male mounting coupler 26. For example, as illustrated here by example and without limitation, the probe 72 of the mounting coupler 26 is set with two pair of the substantially diametrically opposed ribs 78 with their upright pins 68. Similarly, the flange 52 is also set with two pairs of the substantially diametrically opposed entry slots 60. The entry slots 60 are located between pairs of the sockets 66 or at about 22½ degrees and 112½ degrees relative to the interface surface 43 of the base coupler 18. However, other rotational orientations of the entry slots 60 and sockets 66 to the interface surface 43 of the base coupler 18 are also contemplated and may be included and/or substituted without deviating from the scope and intent of the present invention.

As further illustrated in FIG. 19, the entry slots 60 and ribs 78 are optionally provided in pairs similarly substantially diametrically opposed positions, respectively, across the flange 52 of the annular collar 50 of the base coupler 18 and substantially diametrically opposed positions across the tubular stem 74 of the probe 72 of the mounting coupler 26. However, different quantities of the entry slots 60 and ribs 78 are also contemplated and may be included and/or substituted without deviating from the scope and intent of the present invention. For example, three of each of the entry slots 60 and ribs 78 are also contemplated and may be provided either in substantially uniformly distributed positions around the respective flange 52 and tubular stem 74, or else in asymmetrically distributed positions such that assembly and disassembly relative orientation is predetermined.

The male mounting coupler 26 may be rotated relative to the female base coupler 18 to any rotational orientation where the upright pins 68 on the pair of ribs 78 at least approximately corresponds to a pair of the mating sockets 66 as illustrated for example in FIG. 19. Then the pressure 134 is removed and the resilient expansion member or spring 102 is free to expand. The expanding spring 102 pushes spring reaction member 104 against the bar structure 12 directly or against the reaction member seat 122 of the optional rail interface member 22, if present. Expansive spring pressure exerted by the spring 102 pushes the probe 72 of the male mounting coupler 26 outwardly of the longitudinal passage 58 of the interior annular flange 52 of the annular collar 50. Exit of the probe 72 from the interior cavity 53 of the base coupler 18 is arrested by the pairs of pins 68 finding and seating in selected corresponding pairs of mating sockets 66.

Once the pairs of pins 68 are seated in selected corresponding pairs of mating sockets 66, the mounting coupler 26 cannot be further rotated relative to the base coupler 18, and thereafter the orientation of the mounting coupler 26 to the base coupler 18 is fixed.

A change in relative orientation of the mounting coupler 26 to the base coupler 18 is easily accomplished by reapplying the pressure 134 sufficiently to disengage the pins 68 from the currently occupied sockets 66 and rotating the mounting coupler 26 to a new orientation wherein the pins 68 are positioned adjacent to a different selected pair of sockets 66. Upon achieving the new desired relative orientation, the compressive pressure 134 is again removed. Upon removal of the pressure 134, the spring 102 again exerts expansive spring pressure that pushes the probe 72 of the male mounting coupler 26 outwardly of the longitudinal passage 58 of the interior annular flange 52 of the annular collar 50 until the pairs of pins 68 find and seat in different selected corresponding pairs of mating sockets 66.

The mounting coupler 26 is disassembled from the base coupler 18 is easily accomplished by reapplying the pressure 134 sufficiently to disengage the pins 68 from the currently occupied sockets 66 and rotating the mounting coupler 26 to substantially align the pairs of ribs 78 with the pairs of slots 60 in the interior annular flange 52 of the annular collar 50. Once aligned, the cooperating pairs of ribs 78 and slots 60 of the keying feature permit the probe 72 to be removed from the interior cavity 53 of the annular collar 50 by sliding the pair of ribs 78 out through the pair of slots 60 in the flange 52. The spring reaction member 104 follows the probe 72 through the passage 58 in the flange 52 and out of the interior cavity 53 of the annular collar 50. Thereafter, the same or another male mounting coupler 26 may be assembled with the female base coupler 18 as described herein.

Figure 20:
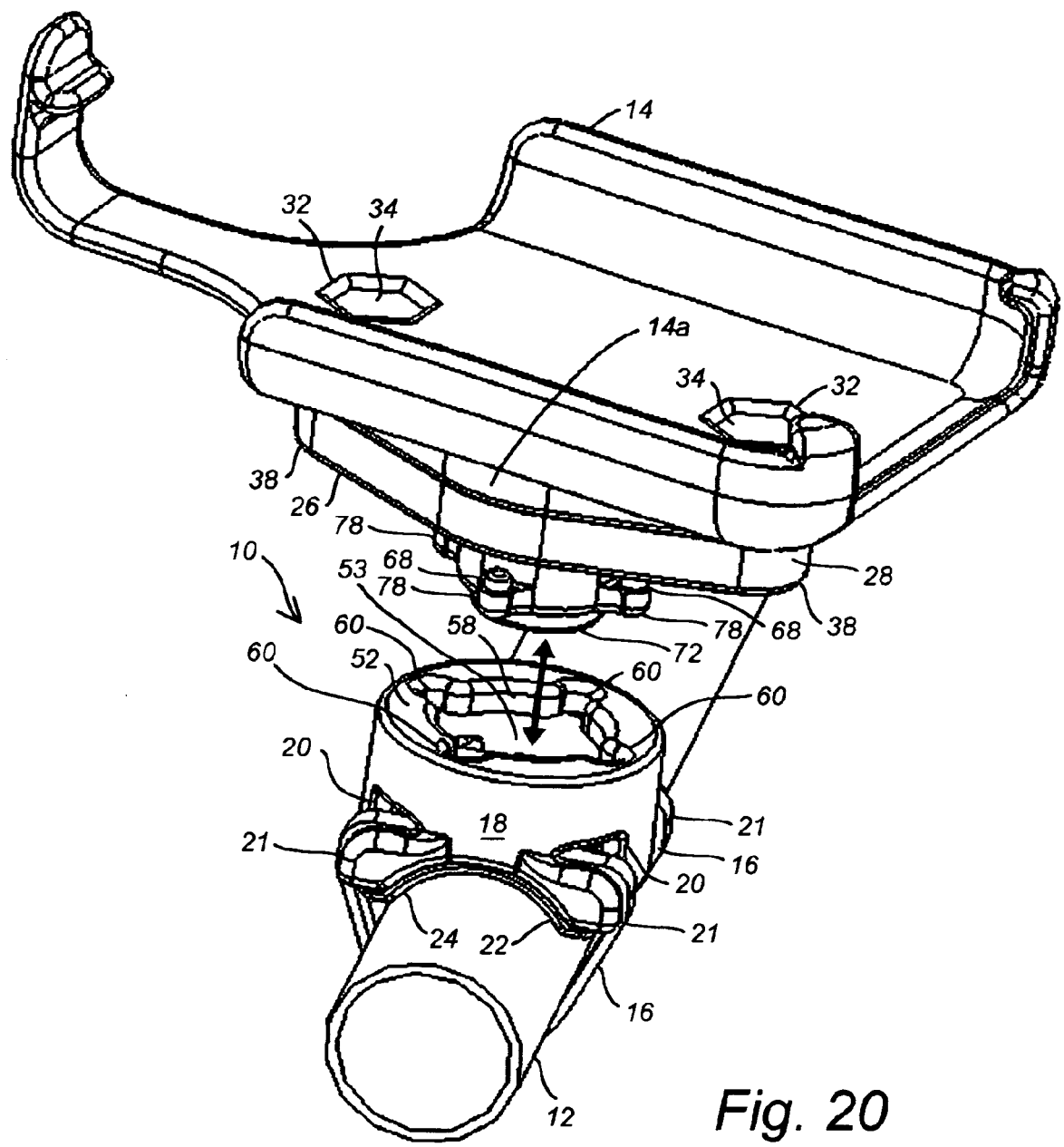
FIG. 20 illustrates both assembly and disassembly of the male mounting coupler of the novel quick connect mounting device with the female base coupler, wherein the device cradle is attached by its interface bracket to an upper mounting surface of the mounting flange portion of the male mounting coupler.

FIG. 20 illustrates both assembly and disassembly of the male mounting coupler 26 of the novel quick connect mounting device 10 with the female base coupler 18, wherein the device cradle 14 is attached by its interface bracket 14a to the upper mounting surface 36 of the mounting flange 28 of the male mounting coupler 26. Both assembly and disassembly of the male mounting coupler 26 and female base coupler 18 are accomplished as discussed herein. Furthermore, changing the rotational orientation of the device cradle 14 relative to the bar structure 12 is accomplished by changing the rotational orientation of the male mounting coupler 26 relative to the female base coupler 18 as further discussed herein.

Figure 21:
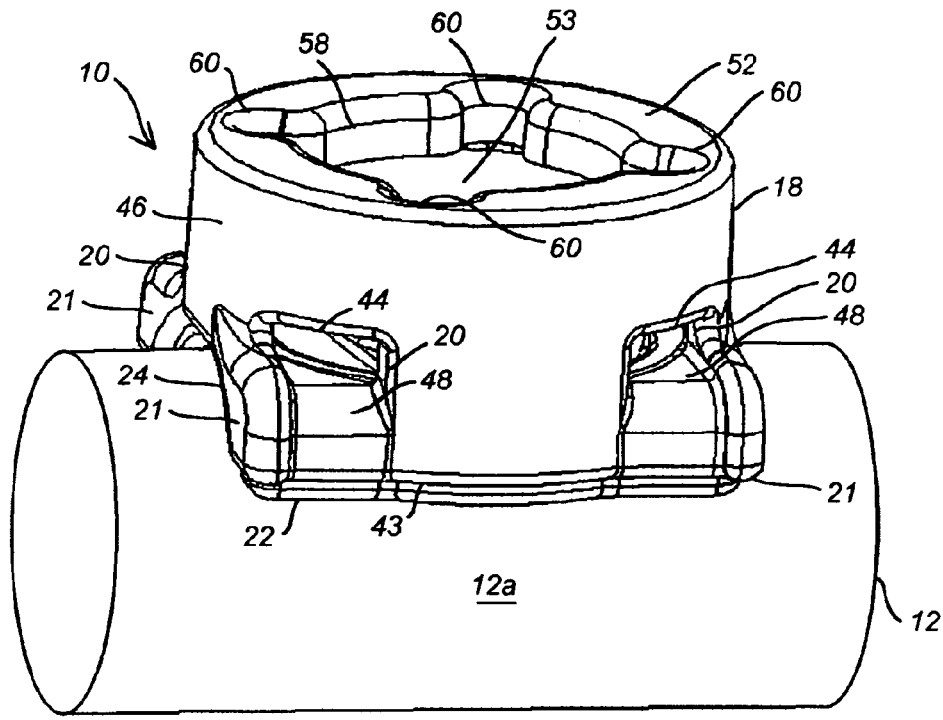
FIG. 21 illustrates the female base coupler of the novel quick connect mounting device having an optional saddle base rail interface member positioned between the base coupler and the rail or bar structure, whereby the optional saddle base rail interface member is operated for adapting the base coupler to cylindrical bar structures having walls of different diameters, or rail or bar structures having walls of different geometric shapes, including square, hexagonal, or octagonal shapes.

FIG. 21 illustrates the female base coupler 18 of the novel quick connect mounting device 10 having the optional saddle base rail interface member 22 positioned between the base coupler 18 and the rail or bar structure 12. Accordingly, the optional saddle base rail interface member 22 is operated for adapting the base coupler 18 to cylindrical bar structures 12 having walls 12a of different diameters, or rail or bar structures 12 having walls 12a of different geometric shapes, including square, hexagonal, or octagonal shapes.

Figure 22:
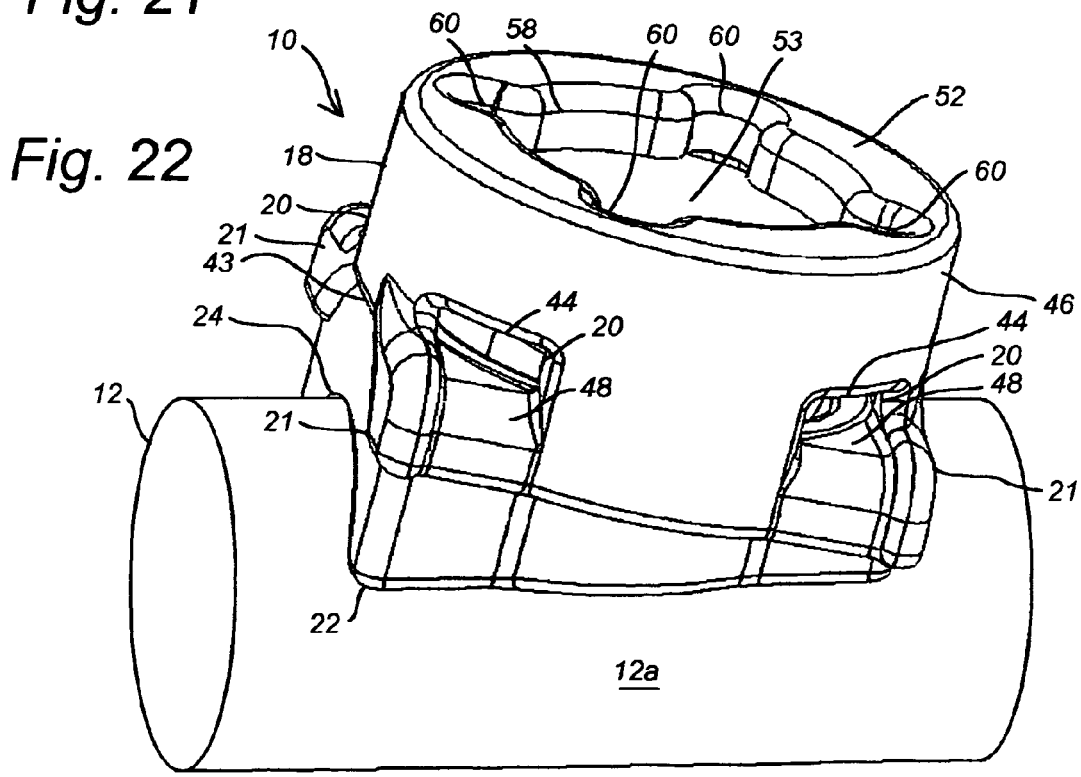
FIG. 22 illustrates the female base coupler of the novel quick connect mounting device having a different one of the optional interchangeable rail interface members positioned between the base coupler and the rail or bar structure, wherein the interface member is optionally configured in a wedge shape for tilting the surface of a flange portion of the female base coupler relative to the bar structure, whereby the interface surface is tilted relative to the wall of the bar structure with the degree of tilt provided by the wedge shaped interface member being optional.

FIG. 22 illustrates the female base coupler 18 of the novel quick connect mounting device 10 having a different one of the optional interchangeable rail interface members 22 positioned between the base coupler 18 and the rail or bar structure 12. Here, the interface member 22 is optionally formed in a wedge shape for tilting the surface 54 of the flange 52 portion of the female base coupler 18 relative to the bar structure 12. When the optionally wedge shaped interface member 22 is positioned between the interface surface 43 of the base coupler 18 and the bar structure 12, the interface surface 24 is tilted relative to the wall 12a of the bar structure 12, as illustrated. The degree of tilt provided by the wedge shaped interface member 22 is optional and can be varied without deviating from the scope and intent of the present invention.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A quick connect mounting device, comprising:
    a female base coupler, comprising:
        an annular collar portion comprising a longitudinally extended tubular sleeve comprising an interior annular flange adjacent to one end thereof and further extended radially inwardly thereof, the interior annular flange having a substantially longitudinal passage formed substantially centrally therethrough between opposing external and internal surfaces thereof, and
        one or more clamp connections;
    a male mounting coupler matable with the female base coupler and rotatable relative thereto in a plurality of different interlockable orientations, the male mounting coupler comprising:

a mounting flange portion comprising an upper mounting surface and an opposing connection surface, a probe portion extended from the connection surface of the mounting flange, the probe comprising:

an outer tubular stem portion comprising a tubular wall sized to be received through the passage formed through the interior annular flange of the female base coupler, and an inner tubular stem portion comprising a tubular wall spaced inwardly of the tubular wall of the outer tubular stem and substantially concentrically aligned therewith and forming an annular groove therebetween, and further comprising an interior flange adjacent to one end thereof spaced away from the connection surface of the mounting flange and extended inwardly of the inside retaining surface having a substantially longitudinal passage formed substantially centrally therethrough, a keying mechanism operable between the outer tubular stem portion of the probe portion and the substantially longitudinal passage formed through the interior annular flange of the annular collar portion of the female base coupler;

an interlocking mechanism operable between the annular collar portion of the female base coupler and the outer tubular stem of the probe portion of the matable male mounting coupler, the interlocking mechanism further comprising one or more detents operable in a plurality of different rotational orientations between the interior annular flange of the annular collar portion of the female base coupler and a portion of the outer tubular stem of the probe portion of the male mounting coupler;

a resilient expansion member resident substantially within the annular groove between the inner and outer tubular stems of the probe portion of the matable male mounting coupler and sized to compressively deflect and resiliently expand substantially therein, the resilient expansion member providing an increase in force substantially proportional to deflection thereof;

an expansion reaction member for resiliently compressive deflection of the resilient expansion member, the expansion reaction member comprising a first portion sized to be at least partially slidingly received into the annular groove between the inner and outer tubular stems;

a retainer member coupled between the expansion reaction member and the interior flange of the inner tubular stem portion of the probe for retaining the expansion reaction member relative to the annular groove between the inner and outer tubular stems of the probe portion of the matable male mounting coupler; and one or more clamps each connectable with one of the clamp connections.

2. The device of claim 1 wherein the keying mechanism further comprises:

a pair of slots formed in an interior lip portion of the interior annular flange of the annular collar across the longitudinal passage formed substantially centrally therethrough and communicating with the passage, and a pair of ribs extended radially outwardly of the outer tubular stem of the probe portion of the matable male mounting coupler adjacent to one end of the outer tubular stem and spaced away from the connection surface of the mounting flange, the pair of ribs being positioned to substantially align with the pair of slots and each rib being sized to pass through a corresponding one of the slots.

3. The device of claim 2 wherein the pair of slots of the keying mechanism further comprises two slots formed in substantially diametrically opposed positions across the longitudinal passage formed through the interior lip portion of the interior annular flange of the annular collar; and the pair of ribs of the keying mechanism further comprises two ribs formed in substantially diametrically opposed positions across the end of the outer tubular stem of the probe.

4. The device of claim 2 wherein the interlocking mechanism further comprises a plurality of pairs of sockets formed in the internal surface of the interior annular flange of the annular collar portion of the female base coupler and substantially uniformly distributed in different substantially diametrically opposed positions across the longitudinal passage formed through the interior lip portion of the interior annular flange of the annular collar portion; and a plurality of pins each sized to be received into one of the sockets, one of the pins being extended from an inner surface of a plurality of the ribs of the outer tubular stem of the probe portion of the male mounting coupler and being further extended substantially toward the connection surface of the mounting flange portion and spaced away therefrom and being further positioned to be received into any one of the sockets.

5. The device of claim 4 wherein the retainer member further comprises an adjustable length between the expansion reaction member and the interior flange of the inner tubular stem portion of the probe.

6. The device of claim 1 wherein the annular collar portion of the female base coupler further comprises a curved interface surface positioned opposite from the interior annular flange.

7. The device of claim 1, further comprising a rail interface member positioned between an interface surface of the base coupler positioned opposite from the interior annular flange, the interface member further comprising a curved rail interface surface, and a coupler interface structure opposite from the rail interface surface, the coupler interface structure further comprising:

an annular wall sized to be received into the longitudinally extended tubular sleeve of the annular collar opposite from the partially closed end thereof and being substantially axially aligned therewith, and a expansion reaction member seat formed substantially centrally of the annular wall.

8. The device of claim 7, further comprising a self-locating mechanism operable between an outer surface of the expansion reaction member and the expansion reaction member seat, wherein the self-locating mechanism further comprises a concavely curved surface on a first one of the outer surface of the expansion reaction member and the expansion reaction member seat, and a correspondingly convexly curved surface on a second opposite one of the outer surface of the expansion reaction member and the expansion reaction member seat.

9. The device of claim 8 wherein each of the one or more clamp connections of the female base coupler further comprises a passage through an annular wall portion of the longitudinally extended tubular sleeve of the annular collar portion of the female base coupler, and a pair of clamp seats positioned on opposite sides of the annular collar portion.

10. A quick connect mounting device, comprising:

a female base coupler, comprising:

a tubular sleeve comprising an interior cavity substantially between an interface surface that is adjacent to a first end of the sleeve and an interior annular flange that is extended radially inwardly of the sleeve adjacent to a second end thereof opposite from the interface surface, the interior annular flange further comprising:
- a substantially longitudinal passage formed substantially centrally therethrough between opposing external and internal surfaces thereof and forming a lip thereabout, and
- a plurality of entry slots communicating with the lip, and one or more clamp connections positioned substantially adjacent to a second end of the sleeve opposite from the interior annular flange;

a male mounting coupler comprising:
- a mounting flange comprising an upper mounting surface and an opposing connection surface, and
- a probe extended from the connection surface of the mounting flange, the probe being matable with the sleeve of the female base coupler and rotatable relative thereto in a plurality of different interlockable orientations, the probe comprising:
  - a tubular stem comprising a tubular wall sized to be received through the passage formed through the interior annular flange of the female base coupler and rotatable therein about a substantially common longitudinal axis therewith, and
  - a plurality of ribs extended from the tubular stem in mating positions with the plurality of entry slots communicating with the lip about the passage through the interior annular flange of the sleeve;

a detent coupleable between one or more of the ribs of the probe and the internal surface of the interior annular flange of the sleeve, each of the detents being operable in a plurality of different rotational orientations of the probe relative to the sleeve about the common longitudinal axis; and a resiliently compressible biasing member coupled for resiliently biasing the ribs of the probe toward the internal surface of the interior annular flange of the sleeve substantially along the common longitudinal axis.

11. The device of claim 10, further comprising one or more clamps each connectable with one of the clamp connections.

12. The device of claim 10, further comprising a rail interface member positioned on the sleeve at the interface surface thereof, the interface member further comprising a nonplanar rail interface surface.

13. The device of claim 12 wherein the interface surface of the tubular sleeve further comprises a mouth opening thereinto; and
wherein the rail interface member further comprises a coupler interface opposite from the rail interface surface, the coupler interface further comprising:
- an annular wall sized to be received into the mouth opening of the tubular sleeve and being substantially axially aligned therewith along the common longitudinal axis, and
- a biasing member reaction seat formed substantially centrally of the annular wall.

14. The device of claim 10, further comprising a biasing reaction member coupled to the probe with the biasing member positioned therebetween, the biasing reaction member being positioned to cooperate with the biasing member reaction seat of the rail interface member.

15. The device of claim 14, further comprising a retainer member coupled between the biasing reaction member and the probe for retaining the biasing member therebetween.

16. The device of claim 15 wherein the probe further comprises an inner tubular stem residing substantially within the tubular stem thereof and forming an annular groove therebetween; and
wherein at least a portion of the biasing member resides in the annular groove between the tubular stem of the probe and the inner tubular stem thereof.

17. A quick connect mounting device, comprising:
a substantially rigid female base coupler, comprising:
- a substantially cylindrical annular collar comprising an open-ended barrel shape that is formed of a longitudinally extended tubular sleeve having a interface surface formed adjacent to a first end thereof, and an opposite second end thereof that is partially closed with an interior annular flange extended substantially radially inwardly thereof,
- a substantially longitudinal passage formed substantially centrally through the interior annular flange between opposing external and internal surfaces thereof and lined with an interior lip portion, the passage further comprising a plurality of slots formed therein and communicating with the interior lip portion, and
- a plurality of clamp connections positioned around the collar adjacent to the first end thereof and distributed on opposite sides of the interface surface, each clamp connection further comprising a clamp seat;

a substantially rigid male mounting coupler matable with the female base coupler and rotatable relative thereto in a plurality of different interlockable orientations, the male mounting coupler comprising:
- a mounting flange comprising an upper mounting surface and an opposing connection surface,
- a substantially cylindrical probe extended from the connection surface of the mounting flange, the probe comprising:
  - a substantially cylindrical outer tubular stem comprising a tubular wall having a mouth opening thereinto at a distal end thereof that is spaced away from the connection surface of the mounting flange, the tubular wall being sized to be received through the passage through the interior annular flange of the female base coupler, and the outer tubular stem further comprising a plurality of ribs extended radially outwardly of the tubular wall adjacent to the distal end thereof and each rib being sized to pass through a corresponding one of the slots formed in the interior lip portion of the passage, and
  - a substantially thimble shaped inner tubular stem comprising a substantially cylindrical tubular wall spaced inwardly of the substantially cylindrical tubular wall of the outer tubular stem and being substantially concentrically aligned therewith and forming an annular groove therebetween;

a plurality of detents operable in a plurality of different rotational orientations between the plurality of ribs on the probe of the male mounting coupler and the internal surface of the interior annular flange of the annular collar of the female base coupler;

a compression spring resident substantially within the annular groove between the inner and outer tubular stems of the probe of the male mounting coupler and sized to compressively deflect and resiliently expand substantially therein;

a spring reaction member comprising a substantially cylindrical wall having at least portion thereof that is sized to be slidingly received into the mouth opening of the outer tubular stem of the probe, and further comprising an end portion thereof spaced away from the inner tubular stem portion thereof;

a retainer member coupled between the end portion of the spring reaction member and the inner tubular stem of the probe for retaining the expansion reaction member relative to the spring and the mouth opening into the outer tubular stem of the probe of the male mounting coupler; and a rail interface member positioned adjacent to a mouth opening of the interface surface of the female base coupler, the rail interface member formed as a saddle base and further comprising:

a curved rail interface surface, and a coupler interface structured opposite from the rail interface surface, the coupler interface comprising:

a substantially cylindrical annular wall sized to be received into the mouth opening of the interface surface of the female base coupler, the annular wall being sized relative to the mouth opening to cause the annular wall to be substantially axially aligned therewith, and a reaction member seat formed substantially centrally of the annular wall, the reaction member seat engaging the end portion of the spring reaction member in a substantially self-locating manner; and one or more clamps each connectable with one of the clamp connections and engaging the clamp seat thereof.

18. The device of claim 17 wherein each of the plurality of detents further comprises a socket formed in the internal surface of the interior annular flange of the annular collar of the female base coupler, and a mating pin being extended from each rib on the probe of the male mounting coupler and being sized to be received into any one of the sockets, the pins being extended substantially toward the connection surface of the mounting flange and spaced away therefrom and being further positioned to be received into any one of the sockets.

19. The device of claim 18 wherein the plurality of slots formed in the passage through the interior annular flange of the female base coupler further comprises one or more pairs of slots formed in the passage in substantially diametrically opposed positions across the passage and communicating with the interior lip portion thereof; and wherein the plurality of ribs extended radially outwardly of the tubular wall of the outer tubular stem of the probe further comprises one or more pairs of ribs formed in diametrically opposed positions across the tubular wall.

20. The device of claim 19 wherein the inner tubular stem of the probe further comprises an interior flange adjacent to the distal end thereof that is spaced away from the connection surface of the mounting flange and extended inwardly of the tubular wall thereof, the interior flange further comprising a substantially longitudinal passage formed substantially centrally therethrough, and an inside retaining surface shaped with a plurality of opposing substantially planar inside walls;

wherein the spring reaction member further comprises a substantially longitudinal passage formed substantially centrally therethrough and communicating with the end portion thereof; and wherein the retainer member further comprises:

a first end portion thereof sized larger than the passage formed through the spring reaction member, a second end portion thereof sized larger than the passage formed through the interior flange of the inner tubular stem of the probe and is further sized to be slidingly received between the plurality of opposing substantially planar side walls of the inside retaining surface of the inner tubular stem portion of the probe and be shaped with a plurality of substantially planar exterior surfaces substantially corresponding to the inside walls of the inside retaining surface for being substantially restrained from turning therein, and a third shaft portion coupling the first and second end portion and further being sized to be slidingly received through both the passage formed through the interior flange of the spring reaction member and the passage formed through the interior flange of the inner tubular stem portion of the probe.

* * * * *